United States Patent [19]

Eling

[11] Patent Number: 5,126,305
[45] Date of Patent: Jun. 30, 1992

[54] CATALYST COMPOSITION

[75] Inventor: Berend Eling, Wezembeek-Oppem, Belgium

[73] Assignee: Imperial Chemical Industries PLC, London, England

[21] Appl. No.: 471,975

[22] Filed: Jan. 29, 1990

[30] Foreign Application Priority Data

Feb. 1, 1989 [GB] United Kingdom ............... 8902228

[51] Int. Cl.⁵ ............................................. B01J 31/00
[52] U.S. Cl. ..................... 502/167; 502/162; 502/171
[58] Field of Search ..................... 502/162, 167, 171

[56] References Cited

U.S. PATENT DOCUMENTS

| | | | |
|---|---|---|---|
| 3,139,449 | 6/1964 | Ahramjian | 502/162 |
| 4,014,935 | 3/1977 | Ibbotson | 502/162 |
| 4,067,820 | 1/1978 | Wagner et al. | 502/162 |
| 4,096,334 | 6/1978 | Keil | 502/162 |
| 4,425,446 | 1/1984 | Malwitz et al. | 502/162 |
| 4,710,521 | 12/1987 | Soukup et al. | 502/167 |
| 4,719,244 | 1/1988 | Müller et al. | 502/167 |

FOREIGN PATENT DOCUMENTS 0100345  8/1979  Japan.
6090051  7/1981  Japan.

Primary Examiner—Patrick P. Garvin
Assistant Examiner—E. D. Irzinski
Attorney, Agent, or Firm—Cushman, Darby & Cushman

[57] ABSTRACT

A catalyst composition comprising an oxo-phospholene carbodiimide catalyst in admixture with a trimerization catalyst which is an alkali salt of a carboxylic monoester, for use in the manufacture of rigid foams containing isocyanurate and carbodiimide linkages.

4 Claims, No Drawings

CATALYST COMPOSITION

This invention relates to a novel catalyst composition which is suitable for the preparation of rigid polymeric foams containing carbodiimide and isocyanurate linkages.

Rigid foams containing isocyanurate and carbodiimide linkages are known in the art.

They are generally prepared by reacting an organic polyisocyanate with a polyol, in the presence of a trimerization catalyst and a carbodiimide formation catalyst—the polyisocyanate to polyol equivalent ratio (i.e. the "isocyanate index") being usually above 150.

As is well known in the art, the formation of carbodiimide linkages generates $CO_2$ which acts as blowing agent and which, together with the isocyanurate linkages imparts the good flame properties to the foams.

Catalyst combinations for the formation of carbodiimides and isocyanurate linkages have already been described. For example, U.S. Pat. No. 4,166,164 discloses isocyanurate-carbodiimide foams obtained by using a combination of a conventional catalyst for the formation of carbodiimide and a strong catalyst promoting isocyanurate formation which is an alkali metal mono- or di-carboxylate of $C_1$-$C_8$ atoms. Examples of suitable carbodiimide promoting catalysts include phosholene oxide or amino alcohols. Suitable isocyanurate promoting catalysts include potassium acetate or potassium 2-ethyl hexanoate.

DD 205 216 further describes a process to obtain carbodiimideisocyanurate foams by using phospholene oxide as carbodiimide forming catalyst and trimerization catalysts selected from alkali mono-carboxylates, alkali mono-alkoholates and epoxidized tertiary amines. These trimerization catalysts are selected for their high chemical activity, so that trimerization occurs readily at room temperature.

GB 1234946 also discloses isocyanurate-carbodiimide foams. Those are obtained merely by mixing polyisocyanate with a catalyst composition comprising carbodiimide and isocyanurate promoting constituents, without addition of any further isocyanate-reactive soft-block component. In particular, there is used potassium oleate as isocyanurate catalyst and a phospholene oxide compound as carbodiimide promoting catalyst.

Other salts have been proposed as isocyanurate catalysts for foam production. Thus, GB-A-2 064 567 describes a process for the production of rigid polyisocyanurate foam by reacting a polyisocyanate with a reaction product of a dibasic carboxylic acid anhydride and a polyether polyol, the latter being partially in the form of an alkali metal or alkaline earth metal alcoholate. Since the reaction product can function as polyol component and trimerisation catalyst simultaneously, it overcomes the problem of using a carboxylate having only limited solubility in the polyols normally used in polyisocyanurate formulations.

It has now been found that a particular combination of at least one carbodiimide catalyst together with at least one specific mild trimerization catalyst leads to superior low density rigid foams containing carbodiimide and isocyanurate linkages. These foams are mainly or even completely $CO_2$ blown, the $CO_2$ being generated by the formation of the carbodiimide linkages. Noteworthy is the fact that in these conditions, further use of physical blowing agent can be completely avoided.

Accordingly, the catalyst combination which has now been found is suitable for making foams having good fire-retardant - and improved smoke-emission properties and an unexpectedly smooth profile and still a sufficient cure and is therefore useful in the preparation of isocyanurate foam slabstocks, press-panels and laminates, especially those which are continuously made.

The foams further show good surface friability properties.

The invention thus provides a catalyst composition comprising:

1) at least one compound of formula (1)

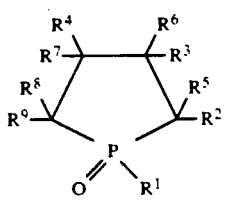

wherein $R^1$ is a substituted or unsubstituted hydrocarbyl group, $R^2$ or $R^4$ is H, Cl or alkyl of 1 to 12 C, while the other group out of $R^2$ or $R^4$ forms a double bond with $R^3$, and $R^5$ to $R^9$ are H, Cl or alkyl of 1 to 12 C; and 2) at least one alkali metal salt of an acid of formula (2):

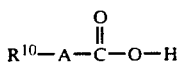

wherein $R^{10}$ represents

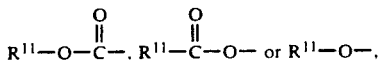

$R^{11}$ representing a substituted or unsubstituted hydrocarbon or heterocyclic radical, and A representing a substituted or unsubstituted chain of 1 to 3 carbon atoms.

Suitable formula (1) compounds (generally referred to as phospholene oxide or oxo-phospholene compounds) include those for which $R^1$ is methyl, ethyl, propyl, isopropyl, n-butyl, tert-butyl, cyclohexyl, n-dodecyl, phenyl, o-, m- or p-tolyl, xylyl, napthyl, 4-diphenyl, 2-phenylethyl, 2-chloroethyl, 2-methoxyethyl, o-, m- or p-chlorophenyl, p-methoxyphenyl and p-N,N-dimethylaminophenyl. Preferably, $R^1$ is alkyl of 1 to 4 C, phenyl or benzyl. The group out of $R_2$ or $R_4$ which does not form a double bond with $R^3$ preferably is H.

As examples of $R^2$ to $R^9$, which may be the same or may be different, there may be mentioned hydrogen, chlorine, methyl, ethyl, propyl, isopropyl and butyl, a preferred lower alkyl group is methyl. Preferably $R^5$ to $R^9$ is H or methyl.

Specific examples of phospholene oxide catalysts which may be used in the present process include:
1-methyl-1-oxo-phospholene
1-phenyl-3-methyl-1-oxo-phospholene
1-benzyl-3-methyl-1-oxo-phospholene
1-ethyl-3-methyl-1-oxo-phospholene Preferred catalysts are 1-methyl-1-oxo-phospholene and 1-phenyl-3-methyl-1-oxo-phospholene, the latest being a particularly preferred catalyst.

Preferred alkali salts of the acid of formula (2) are the Na+ and K+ salts. If desired, mixtures of such salts may be used, for example a mixture of potassium and sodium salts, or mixtures of one or more of the salts with a free acid of formula 2.

Suitably, radical $R^{11}$ of formula (2) is a substituted or unsubstituted alkyl, cycloalkyl, aralkyl or polyoxyalkylene aryl radicals. Examples of suitable substituents include hydroxy groups like in hydroxy terminated polyoxyalkylene radicals, for example hydroxy terminated polyoxyethylene radicals.

Preferred formula (2) compounds are those for which $R^{11}$ has no isocyanate-reactive end groups.

Suitably, radical A of formula (2) may be selected from the divalent radicals

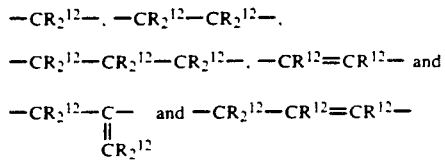

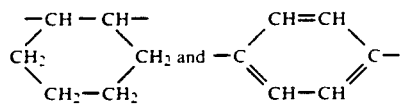

wherein $R^{12}$ is hydrogen, alkyl of 1 to 12 C or one of the following radicals:

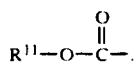 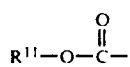

In general, salts of acids of formula 1 wherein A is a non-substituted $C_1$-$C_3$ radical are preferred on account of their improved catlystic properties, especially salts of maleic acid, A then being a radical of the formula —CH=CH—. Also on the ground of improved properties it is preferred that $R^{10}$ is a radical of the formula:

The acids of formula 2 wherein $R^{10}$ is $$R^{11}-O-\overset{O}{\underset{\|}{C}}-$$

may be prepared by reaching an alcohol of the formula:

$R^{11}-OH$ (2')

with an acid anhydride of the formula:

wherein $R^{11}$ and A have the meansings given above.

Examples of compounds of formula 2' which may be used include alcohols, for example 2-octanol, cyclohexanol or benzyl alcohol, phenols, polylactic acid and polyoxyalkylene polyols such as polyethylene glycols, especially polyethylene glycols having molecular weights below 500.

Example of suitable acid anhydrides include succinic, glutaric, maleic, phthalic and itaconic anhydrides and the anhydrides of 1,2-cyclohexane and 1,2-cyclohexene dicarboxylic acids.

Acids of formula 2 wherein $R^{10}$ is $R^{11}$—C—O— may be prepared by reacting an acid of the formula $R^{11}COOH$ with a hydroxy acid of the formula:

Acids of formula 2 wherein $R^{10}$ is $R^{11}$—O— may be prepared as for instance described in Beilstein's Handbuch der Organischen Chemie, 3, 232 and 3, 233. The salts may be formed from the free acids in conventional manner, for example by reacting an acid of formula 2 with the appropriate metal carbonate. If desired, a deficiency of metal carbonate may be used so that the product is a mixture of salt and free acid.

In addition to these required catalysts, there may also be present at least one metal of group IIa of the Periodic Table of Chemical Elements or Zn carboxylate of formula (3)

 (3)

wherein Q represents a metal of group IIa of the Peroidic Table of Chemical Elements or Zn and wherein $R^{12}$ is $R^{10}$—A— as hereabove indicated in (2) or

wherein $R^{13}$, $R^{14}$, $R^{15}$ are the same or different and represent H or alkyl of 1 to 12 C, cycloalkyl, phenyl or alkylphenyl.

The carboxylate of formula (3) may be derived from the same acid of formula (2) as hereabove described or may be different. A mixture of different group IIa metal carboxylates of formula (3) may also be used.

In these compounds, $R^{13}$ is preferably selected from H and methyl, $R^{14}$ from H, methyl and ethyl, and $R^{15}$ from methyl, ethyl, isopropyl, butyl and cyclohexyl. Most preferably $R^{13}$ is H, $R^{14}$ is $C_2H_5$ and $R^{15}$ is $C_4H_9$. Preferred compounds of formula (3) are those which do not form a precipitate from the reaction mixture.

The salt is preferably a calcium or strontium salt but may be a barium, magnesium or zinc salt.

Suitable acids include for example those mentioned under formula (2) compounds and hexanoic acid, 2-methyl-hexanoic acid, 2-ethyl-hexanoic acid, cyclohexyl-acetic acid, trimethylacetic acid, isovaleric acid and butyric acid.

In addition to these catalyst components, still other catalysts may be used in carrying out the invention, as for instance tertiary amines, for example cyclohexyl-dimethyl-amine or tetraethylene diamine. The use of tertiary amine catalysts is very useful in reaction systems that contain small amounts of water.

As a diluent of the catalyst several glycols can be used such as a monoethylene glycol, diethylene glycol and higher polyethyleneoxides (molecular weight preferably below 600). Polypropyleneoxides (molecular weight preferably below 3000) are also suitable diluents, as well as ethoxylated nonylphenol.

The catalyst composition of the present invention can be prepared by merely mixing the different ingredients in an appropriate diluent.

The foams obtained in accordance with the present invention are prepared by bringing together an organic polyisocyanate, a polyol and a catalytically effective amount of the catalyst composition.

The polyols used in the preparation of the foam containing urethane and isocyanurate groups in accordance with the present invention may be any of those known in the art to be useful as component in the preparation of foams containing urethane and isocyanurate groups.

Preferred polyols are polyether polyols and polyester polyols having 2 to 8 OH-groups per molecule and hydroxyl values in the range of 100 to 600 mg KOH/g.

Suitable polyester polyols are advantageously obtained by condensation polymerisation of dicarboxylic acids with glycols, such as adipic acid with diethylene glycol, phthalic anhydride with glycol and other diacids and glycols conventional in the art, possibly in the presence of polyols and/or polyacids of higher functionality, and by depolymerisation of polyesters such as polyethylene-terephthalate in the presence of glycol. Suitable polyethers are advantageously obtained by addition of propylene oxide and/or ethylene oxide to polyfunctional alcohol or amine starter materials. Most preferred polyol is a polyester polyol derived from polyethylene terephtalate.

Also the polyisocyanates employed can be any of the organic polyisocyanates conventionally employed. Preferred polyisocyanates are diphenyl methane diisocyanates, polyphenylene polymethylene polyisocyanate and toluene polyisocyanates and mixtures thereof. Most preferred are diphenylmethane diisocyanates and polyphenylene polymethylene polyisocyanates. Foaming agents and other optional additives such as dispersing agents, cell stabilisers, surfactants, flame retardants and the like can be employed as required. In manufacturing the foams in accordance with the process of the invention, the procedure and equipment conventional in the art are employed.

The polyisocyanate may be reacted with the polyol in amounts which provide an isocyanate index in the range of 150 to 600, preferably 220 to 300.

Optionally, small amounts of $H_2O$ should be used in the foaming mixture, in amounts of up to 1 % by weight of total foaming composition.

Noteworthy is the fact that by using the catalyst system of the present invention, the use of inert blowing agent(s) can be drastically reduced and even completely avoided.

When present suitable blowing agents include inert volatile liquids, especially halogenated alkanes such as trichlorofluoro-methane and dichlorodifluoromethane. In this case, preferred blowing agents include those having a boiling point between 25° C. and 120° C., such as 1,1,1 trichloroethane or chlorofluorohydrocarbons.

Catalytically effective amounts of phospholene oxides may vary between 0.05 and 4 g/100 g of the total reaction system.

Amounts of alkali metal salt(s) of formula (2) acid should be at most 100 mmoles/100 g of total reaction system.

The group IIa or Zn carboxylate of formula (3), when present, should be used in amounts of $5 \times 10^{-5}$ to $7 \times 10^{-3}$ moles/100 g of total reaction system.

When a tertiary amine is present, amounts between $5 \times 10^{-4}$ and $3 \times 10^{-2}$ mol/100 g of total reaction system should be used.

The present invention thus further provides a reaction system for use in the preparation of carbodiimide-isocyanurate rigid foams comprising:
(A) an organic polyisocyanate and
(B) a polyol component comprising
  (i) a polymeric polyol having a hydroxyl number in the range 100–600 mg KOH/g
  (ii) $H_2O$ in an amount of 0% to 1% by weight of total reaction system
  (iii) a catalytically effective amount of the catalyst composition of the present invention.

The reaction system of the present invention may further comprise inert physical blowing agents and any further additives which are conventional in the art.

It is usually convenient to incorporate the catalyst system in the polyol component of above system, together with any other additives, prior to reaction with the polyisocyanate. Accordingly, the present invention further provides a polyol composition comprising:
(i) a polymeric polyol having a hydroxyl number in the range 100–600 mg KOH/g
(ii) $H_2O$ in an amount of 0% to 1% by weight of total reaction system
(iii) a catalytically effective amount of the catalyst system of the present invention.

The foams obtained by using the catalyst system of the invention are characterized by good fire resistance as indicated by the oxygen index and the Kleinbrenner or B-2 test (DIN 4102-Part 1) even in the absence of added fire retardant. Further improvements may be obtained by the inclusion of fire retardants containing phosphorus or halogen atoms, for example dimethyl methylphosphonate or tris(chloropropyl) phosphate.

The present foams are particularly suitable as fire resistant structural elements using conventional lamination techniques. They show specific gravities of up to 60 kg/m$^3$, preferably between 25 and 40 kg/m3.

The invention is illustrated but not limited by the following examples in which all parts are by weight.

EXAMPLE 1

Preparation of catalyst A

A 3-neck round-bottomed flask fitted with stirrer, thermometer and condenser was charged with one mole of polyethylene glycol (MW 200) and the temperature was raised to 50 Deg. C. One mole of maleic anhydride was added portionwise at such rate that each portion had reacted before the addition of a further amount. When the reaction was completed, as indicated by acid titration, the reaction temperature was decreased to 30° C. Subsequently 50% by weight of the content of the flask of methanol was added. Then, half a mole of potassium carbonate was added portionwise at such a rate that the frothing due to carbon dioxide liberation was controllable. After the completion of this saponification reaction, a 50/50 by weight mixture of dipropylene glycol an ethylene glycol was added. The amount of glycol mixture added was equal to the weight of the synthesised salt, i.e. the weight of the diol mixture was equal to the (total) weight of one mole of polyethylene glycol, maleic anhydride and one mole of alkali metal. The methanol and water were removed under vacuum in a rotary evaporator at a water bath temperature of approximately 80° C. A typical analysis of the alkali carboxylates produced by this method is a water content of approximately 0.2–0.4% and an acid value of 1–3 mg KOH/g.

EXAMPLE 2

Preparation of catalyst B

Catalyst B was prepared as described in example 1, using sodium carbonate instead of potassium carbonate.

EXAMPLE 3

Formulation 1 was prepared by mixing together 36.0 parts by weight (pbw) of a polyester polyol having a hydroxyl value of 50 mg KOH/g, derived from an aromatic carboxylic ester, 0.35 pbw of a silicone surfactant sold by DOW Corning Corporation, 12.2 pbw of chlorofluoromethane, 1.0 pbw of potassium 2-ethylhexanoate (a 50% solution in polypropylene glycol of Mw 425).

EXAMPLE 4

Formulation 2 was prepared by mixing together 32.3 pbw of a polyester polyol as described in example 3, 0.23 pbw of $H_2O$, 0.38 pbw of a silicone surfactant as described in example 3, 3.4 pbw of chlorofluoromethane, 0.16 pbw of dimethylcyclohexyl-amine (a tertiary amine catalyst), 0.80 pbw of potassium 2-ethylhexanoate as described in example 3, 0.40 pbw of monoethylene glycol, 0.40 pbw of dipropylene glycol and 0.46 pbw of 1-phenyl-3-methyl-1-oxo-phospholene.

EXAMPLE 5

Formulation 3 was prepared by mixing together 32.3 pbw of a polyester polyol as described in example 3, 0.23 pbw of $H_2O$, 0.38 pbw of a silicone surfactant as described in example 3, 3.4 pbw of chlorofluoromethane, 0.16 pbw of dimethyl-cyclohexylamine, 0.80 pbw of potassium 2-ethyl-hexanoate as described in example 3, 0.40 pbw of monoethylene glycol, 0.40 pbw of dipropylene glycol and 0.23 pbw of 1-methyl-1-oxophospholene.

EXAMPLE 6

Formulation 4 was prepared by mixing together 32.3 pbw of a polyester polyol as described in example 3, 0.23 pbw of $H_2O$, 0.38 pbw of silicone surfactant as described in example 3, 3.4 pbw of chlorofluoromethane, 0.16 pbw of dimethyl-cyclohexylamine, 0.72 pbw of potassium oleate, 0.40 pbw of monoethylene glycol, 0.40 pbw of dipropylene glycol and 0.46 pbw of 1-phenyl-3-methyl-1-oxo-phospholene.

EXAMPLE 7

Formulation 5 was prepared by mixing together 32.3 pbw of a polyester polyol as described in example 3, 0.23 pbw of $H_2O$, 0.38 pbw of a silicone surfactant as described in example 3, 3.4 pbw of chlorofluoromethane, 0.16 pbw of dimethylcyclohexyl-amine, 0.72 pbw of potassium oleate, 0.40 pbw of monoethylene glycol, 0.40 pbw of dipropylene glycol and 0.23 pbw of 1-methyl-1-oxo-phospholene.

EXAMPLE 8

Formulation 6 was prepared by mixing together 32.3 pbw of a polyester polyol as described in example 3, 0.23 pbw of $H_2O$, 0.38 pbw of a silicone surfactant as described in example 3, 3.4 pbw of chlorofluoromethane, 0.16 pbw of dimethylcyclohexyl-amine, 1.55 pbw of Catalyst A of example 1 (dissolved in monoethylene glycol/dipropylene glycol at a ratio of 50/25/25 by weight) and 0.46 pbw of 1-phenyl-3-methyl-1-oxophospholene.

EXAMPLE 9

Formulation 7 was prepared by mixing together 32.3 pbw of a polyester polyol as described in example 3, 0.23 pbw of $H_2O$, 0.38 pbw of a silicone surfactant as described in example 3, 3.4 pbw of chlorofluoromethane, 0.16 pbw of dimethylcyclohexyl-amine, 1.55 pbw of Catalyst A of example 8 and 0.23 pbw of 1-methyl-1-oxo-phospholene.

EXAMPLE 10

Formulation 8 was prepared by mixing together 30.2 pbw of a polyester polyol as described in example 3, 0.22 pbw of $H_2O$, 0.36 pbw of a silicone surfactant as described in example 3, 3.3 pbw of chlorofluoromethane, 0.15 pbw of dimethylcyclohexyl-amine, 2.55 pbw of Catalyst B of example 2 (dissolved in monoethylene glycol/dipropylene glycol at a ratio of 50/25/25) and 0.46 pbw of 1-phenyl 3-methyl-1-oxophospholene.

EXAMPLE 11

Formulation 9 was prepared by mixing together 30.2 pbw of a polyester polyol as described in example 3, 0.22 pbw of $H_2O$, 0.36 pbw of a silicone surfactant as described in example 3, 3.3 pbw of chlorofluoromethane, 0.15 pbw of dimethylcyclohexyl-amine, 2.55 pbw of Catalyst B of example 10 and 0.23 pbw of 1-methyl-1-oxo-phospholene.

EXAMPLE 12

Formulation 10 was prepared by mixing together 21.0 pbw of a polyester polyol as described in example 3, 0.60 pbw of $H_2O$, 0.50 pbw of a silicone surfactant as described in example 3, 0.20 pbw of dimethyl-cyclohexyl-amine, 1.05 pbw of potassium 2-ethyl-hexanoate as described in example 3, 0.5 pbw of monoethylene glycol, 0.5 pbw of dipropylene glycol and 0.6 pbw of 1-phenyl-3-methyl-1-oxo-phospholene.

EXAMPLE 13

Formulation 11 was prepared by mixing together 21.0 pbw of a polyester polyol as described in example 3, 0.60 pbw of $H_2O$, 0.50 pbw of a silicone surfactant as described in example 3, 0.20 pbw of dimethyl-cyclohexyl-amine, 2.0 pbw of Catalyst A of example 8 and 0.6 pbw of 1-phenyl-3-methyl-1-oxo-phospholene.

EXAMPLE 14

Formulation 12 was prepared by mixing together 19.6 pbw of a polyester polyol as described in example 3, 0.58 pbw of $H_2O$, 0.48 pbw of a silicone surfactant as described in example 3, 0.20 pbw dimethyl-cyclohexyl-amine, 1.95 pbw of Catalyst A of example 8, 195 pbw of calcium 2-ethyl-hexanoate (a 40% solution in polypropylene glycol of Mw 425) and 0.6 pbw of 1-phenyl-3-methyl-1-oxo-phospholene.

EXAMPLE 15

A conventional chlorofluorocarbon (CFC)-blown isocyanurate rigid foam was produced by mixing formulation 1 with 50.7 pbw of polymethylene polyphenylene polyisocyanate (polymeric MDI) at an isocyanate index of 250. The formulation contained a strong isocyanurate catalyst:potassium 2-ethyl-hexanoate.

The resultant foam had the following properties:

| Properties | Formulation 1 |
|---|---|
| cream time (s) | 18 |
| string time (s) | 31 |
| end of rise time (s) | 75 |
| density (kg/m³) | 34 |
| oxygen index (ASTM D 2863) (%) | 24.2 |
| Buttler Chimney test (ADTM D 3014) (% weight retained) | 85 |
| Kleinbrenner "K" (Din 4102 part 1) class | B-2 |
| Kleinbrennr "K" (Din 4102 part 1) cm flame height | 10 |
| NBS-smoke test (ASTM E 662) specific optical density | 53 |

EXAMPLE 16

Two conventional carbodiimide-isocyanurate rigid foams were prepared as comparative examples. The foams are obtained by mixing formulations 2 and 3 with 61.6 pbw of polymeric MDI, at an isocyanate index of 250. The formulations contained a strong isocyanurate-promoting catalys:potassium 2-ethylhexanoate, in admixture with an oxo-phospholene carbodiimide catalyst. The foams were partially CFC—, partially $H_2O$-blown.

They showed the following properties:

| Properties | Formulations | |
|---|---|---|
| | 2 | 3 |
| cream time (s) | 20 | 16 |
| string time (s) | 31 | 24 |
| end of rise time (s) | 90 | 65 |
| density (kg/m³) | 45 | 39 |
| oxygen index (ASTM D 2963) (%) | 24.0 | 23.9 |
| Buttler Chimney test (ADTM D 3014) (% weight retained) | 84 | 84 |
| Kleinbrenner "K" (Din 4102 part 1) class | B-2 | B-2 |
| Kleinbrenner "K" (Din 4102 part 1) cm flame height | 10.5 | 10.5 |
| NBS-smoke test (ASTM E 662) specific optical density | 69 | 95 |

EXAMPLE 17

Two further isocyanurate-carbodiimide rigid foams were prepared as counter-examples. The foams were obtained as in above example, by mixing formulations 4 and 5 with 61.6 pbw of polymeric MDI, at an isocyanurate index of 250. In these formulations, the strong isocyanurate-promoting catalyst—potassium 2-ethylhexanoate—is replaced with another strong isocyanurate catalyst:potassium oleate.

The foams thus obtained showed the following properties:

| Properties | Formulations | |
|---|---|---|
| | 4 | 5 |
| cream time (s) | 15 | 14 |
| string time (s) | 26 | 22 |
| end of rise time (s) | 80 | 75 |
| density (kg/m³) | 43 | 38 |
| oxygen index (ASTM D 2863) (%) | 23.9 | 24.0 |
| Buttler Chimney test (ADTM D 3014) (% weight retained) | 83 | 84 |
| Kleinbrenner "K" (Din 4102 part 1) class | B-2 | B-2 |
| Kleinbrenner "K" (Din 4102 part 1) cm flame height | 11 | 11 |
| NBS-smoke test (ASTM E 662) specific optical density | 117 | 122 |

EXAMPLE 18

Two carbodiimide-iscyanurate rigid foams according to the present invention were obtained as described in above examples 15-16, by using formulations 6 and 7. The formulations contain a mild trimerization atalyst—a potassium monomaleate ester—in admixture with a carbodiimide promoting catalyst.

N.B.

The potassium level was kept constant throughout formulations 2 to 7, as well as the polyol/isocynate weight ratio.

The foams thus obtained showed the following properties:

| Properties | Formulations | |
|---|---|---|
| | 6 | 7 |
| cream time (s) | 26 | 16 |
| string time (s) | 45 | 30 |
| end of rise time (s) | 110 | 85 |
| density (kg/m³) | 37 | 33 |
| oxygen index (ASTM D 2863) (%) | 23.8 | 23.4 |
| Buttler Chimney test (ADTM D 3014) (% weight retained) | 83 | 74 |
| Kleinbrenner "K" (Din 4102 part 1) class | B-2 | B-2 |
| Kleinbrenner "K" (Din 4102 part 1) cm flame height | 11 | 11.5 |
| NBS-smoke test (ASTM E 662) specific optical density | 67 | 50 |

EXAMPLE 19

Two carbodiimide-isocyanurate rigid foams according to the present invention were prepared as described in example 18, by using formulations 8 and 9 wherein the mild trimerization catalyst is sodium monomaleate ester. Formulations 8 and 9 were mixed with 63 pbw of polymeric MDI. The isocyanate index remained equal to 250.

The foams thus obtained showed the following properties:

| Properties | Formulations | |
|---|---|---|
| | 8 | 9 |
| cream time (s) | 27 | 20 |
| string time (s) | 60 | 34 |
| end of rise time (s) | 160 | 95 |
| density (kg/m³) | 34 | 31 |
| oxygen index (ASTM D 2863) (%) | 23.6 | 23.0 |
| Buttler Chimney test (ADTM D 3014) (% weight retained) | 81 | 62 |
| Kleinbrenner "K" (Din 4102 part 1) class | B-2 | B-2 |
| Kleinbrenner "K" (Din 4102 part 1) cm flame height | 10.5 | 13 |
| NBS-smoke test (ASTM E 662) specific optical density | 67 | 85 |

EXAMPLE 20

A carbodiimide-isocyanurate rigid foam was prepared—as comparative example—in the absence of any physical blowing agent. A strong trimerization catalyst was used:potassium 2-ethyl-hexanoate—in admixture with a carbodiimide-promoting catalyst. The foam was obtained by reacting 74 pbw of polymeric MDI with formulation 10, at an isocyanate index of 300.

The foam thus obtained showed the following properties:

| Properties | Formulation 10 |
|---|---|
| cream time (s) | 18 |
| string time (s) | 36 |
| end of rise time (s) | 100 |
| density (kg/m³) | 38 |
| oxygen index (ASTM D 2963) (%) | 23.8 |
| Buttler Chimney test (ADTM D 3014) (% weight retained) | 83 |
| Kleinbrenner "K" (Din 4102 part 1) class | B-2 |
| Kleinbrenner "K" (Din 4102 part 1) cm flame height | 13 |
| NBS-smoke test (ASTM E 662) specific optical density | 117 |

EXAMPLE 21

Two carbodiimide-isocyanurate rigid foams according to the present invention—were prepared in the absence of any physical blowing agent. The foams were obtained as in above comparative example, by mixing formulations 11 and 12 with 74 pbw of polymeric MDI, at an isocyanate index of 300. Formulation 11 contained a mild trimerization catalyst—potassium monomaleate ester in combination with an oxo-pholpholene catalyst. Formulation 12 contained—in addition to the same catalysts—a supplementary trimerization catalyst:calcium 2-ethyl-hexanoate.

N.B.: The potassium level was kept constant throughout formulations 10 to 12, as well as the polyol/isocyanate ratio.

The foams thus obtained showed the following properties:

| Properties | Formulations 11 | 12 |
|---|---|---|
| cream time (s) | 24 | 20 |
| string time (s) | 46 | 43 |
| end of rise time (s) | 105 | 140 |
| density (kg/m³) | 34 | 32 |
| oxygen index (ASTM D 2863) (%) | 23.5 | 23.4 |
| Buttler Chimney test (ADTM D 3014) (% weight retained) | 81 | 82 |
| Kleinbrenner "K" (Din 4102 part 1) class | B-2 | B-2 |
| Kleinbrenner "K" (Din 4102 part 1) cm flame height | 13.0 | 13.0 |
| NBS-smoke test (ASTM E 662) specific optical density | 67 | 69 |

EXAMPLE 22

Preparation of catalyst C

Catalyst C was prepared as described in example 1, using succinic anhydride instead of maleic anhydride. This catalyst was dissolved in ethylene glycol at a ratio of 1 to 1 (catalyst C).

EXAMPLE 23

Preparation of catalyst D

Catalyst D was prepared as described in example 1, using phtalic anhydride instead of maleic anhydride. This catalyst was dissolved in ethylene glycol at a ratio of 1 to 1 (catalyst D).

EXAMPLE 24

Preparation of catalyst E

Catalyst E was prepared as described in example 1, using ethoxy-ethoxy-ethanol instead of the polyethylene glycol. This catalyst was dissolved in ethylene glycol at a ratio of 1 to 1 (catalyst E).

EXAMPLE 25

Preparation of catalyst F

Catalyst F was prepared as described in example 1 using cis-cyclohexane-1,2-dicarboxylic anhydride instead of maleic anhydride and ethoxy-ethoxy-ethanol instead of polyethylene glycol. This catalyst was dissolved in ethylene glycol at a ratio of 1 to 1 (catalyst F).

EXAMPLE 26

The potassium salts of succinic acid and suberic acid were found to be insoluble in polyol and could therefore not be employed as Catalysts in the isocyanurate formation reaction. The solubility of the first salt in methanol amounted to 2.0 g/100 g of methanol.

EXAMPLE 27-32

Formulations 13-18 were prepared by mixing together a polyester polyol having a hydroxyl value of 235 mg KOH/g (Chardol 336), 0.70 pbw of a silicone surfactant (Goldsmidt's B 8408), 0.15 pbw of dimethyl-cyclohexyl-amine, 0.10 pbw of 1-methyl-1-oxophospholene, 0.25 pbw of $H_2O$, 7.00 pbw of Arcton 11 and catalyst and in some formulations some monoethylene glycol (MEg) and/or dipropylene glycol (DPg).

From these formulations foams were made having an index of 250 at a constant reaction profile (string time 30 +/− 1 sec); the foam formulations have been corrected for the different levels of DPg/MEg in the catalyst blends. The polyisocyanate used was Hexacal F obtainable from ICI PLC.

The table below gives the amount of polyol, MEg, DPg and polyisocyanate used as well as the type and amount of catalyst employed; further the cream time (sec), the end of rise time (sec), the free rise density (Kg/m³), the oxygen index (%) and the surface friability.

| Example | 27 | 28 | 29 | 30 | 31 | 32 |
|---|---|---|---|---|---|---|
| Formulation | 13 | 14 | 15 | 16 | 17 | 18 |
| Polyol | 26.06 | 25.71 | 25.92 | 24.78 | 25.93 | 25.86 |
| MEg | 1.15 | 0.65 | 0.15 | 0 | 0.35 | 0.63 |
| DPg | 0.50 | 0 | 0.50 | 0.50 | 0.50 | 0.50 |
| Dabco T 45 | 0.50 | — | — | — | — | — |
| cat. A | — | 2.50 | — | — | — | — |
| C | — | — | 2.00 | — | — | — |
| D | — | — | — | 5.00 | — | — |
| E | — | — | — | — | 1.70 | — |
| F | — | — | — | — | — | 2.1 |
| Hexacal | 63.53 | 62.98 | 63.31 | 61.51 | 63.33 | 63.21 |
| cream time | 15 | 15 | 12 | 15 | 15 | 12 |
| rise time | 85 | 85 | 90 | 85 | 75 | 75 |
| density | 33.1 | 27.7 | 27.5 | 20.8 | 28.7 | 24.4 |
| oxygen density | 24.1 | 24.7 | 24.1 | 23.3 | 24.0 | 24.3 |
| surface friability | 3 | 2 | 2 | 5 | 1 | 4 |

The surface friability was determined arbitrarily, the ranking is as follows: 5=totally unacceptable, 4=unacceptable, 3=border line, 2=acceptable, 1=very good. Dabco T-45 is the same catalyst used in example 3.

I claim:

1. A catalyst composition for the preparation of carbodiimide and isocyanurate containing rigid foams comprising a carbodiimide catalyst in combination with a mild trimerization catalyst, wherein there is used as the carbodiimide catalyst (1) at least one compound of formula (1):

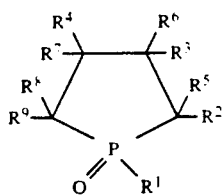

wherein $R^1$ is phenyl, methyl, ethyl or propyl, $R^2$ or $R^4$ is H, Cl or alkyl of 1 to 12 C, while the other group out of $R^2$ or $R^4$ forms a double bond with $R^3$, and $R^5$ to $R^9$ are H, Cl or alkyl of 1 to 12 C;

(2) and the mild trimerisation catalyst is at least one alkali metal salt of an acid of formula (2)

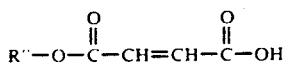

wherein $R^{11}$ represents a hydrocarbon or a heterocyclic radical which may be substituted with a hydroxy group.

2. A catalyst composition according to claim 1 which further comprises at least one alkaline earth metal or Zinc carboxylate of formula (3):

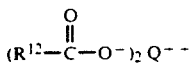

wherein Q represents a metal of group IIa of the Periodic Table of Chemical Elements or Zn and wherein $R^{12}$ is $R^{10}$—A— as indicated in formula (2) hereabove or

wherein $R^{13}$, $R^{14}$, $R^{15}$ are the same or different and represent H or alkyl of 1 to 12 C, cycloalkyl, phenyl or alkylphenyl.

3. A catalyst composition according to claim 1 which also comprises a tertiary amine catalyst.

4. A catalyst composition according to claim 1 wherein the formula (1) compound is 1-phenyl-3-methyl-1-oxophospholene or 1-methyl-1-oxo-phospholene or a mixture thereof.

* * * * *